UNITED STATES PATENT OFFICE.

STUART B. MOLONY, OF WELLESLEY HILLS, MASSACHUSETTS.

UTILIZING VULCANIZED WASTE RUBBER.

1,384,773.

Specification of Letters Patent. Patented July 19, 1921.

No Drawing. Application filed March 30, 1918. Serial No. 225,803.

*To all whom it may concern:*

Be it known that I, STUART B. MOLONY, a citizen of the United States, residing at Wellesley Hills, in the county of Norfolk and State of Massachusetts, have invented a certain Process for Utilizing Vulcanized Waste Rubber, of which the following is a specification.

This invention relates to the utilization of vulcanized waste rubber containing cotton or other fabric such as the canvas or cord part of automobile tires, rubber belts, etc.

Such scrap is now utilized largely by first grinding it to allow easy penetration by chemicals, and then through the destruction of the fiber by subjecting it to the action of acids and alkalies. The following invention relates to the utilization of such material by first:—converting it into hard rubber, and second:—either utilizing it as it is without separation of the fabric, or by the grinding and separation of the fiber from the hard rubber dust through sifting, air flotation, or other similar means.

This is an improvement in the utilization of scrap rubber containing fabric through its direct conversion into hard rubber by the absorption of sulfur without the cost of grinding or compounding, or changing its form in any way, except to cut it or reduce it by other means to pieces of suitable size. The resulting hard rubber, with the fabric embedded also has the advantage over the original scrap in that because of its hardness it can be ground fine to make possible mechanical means of separation from the fiber, and because of its greater specific gravity than soft rubber, it can be more easily separated from the fiber by flotation after grinding. The fabric and hard rubber can also be subjected to sufficient heat to weaken the fiber so it can be more easily ground to a powder, if the separation of the hard rubber and the fiber is not desired.

In order to convert soft rubber scrap into hard rubber it is necessary to add up to 32% more sulfur, depending upon the amount of sulfur already present, and upon the results desired. In order to add this sulfur, and accomplish the conversion of the vulcanized soft rubber fabric scrap into hard rubber without grinding it, I make use of the fact that sulfur enters into solution in rubber before vulcanization takes place, and also during vulcanization; and that like any material going into solution it will diffuse into rubber to a slight degree. In addition to this property of diffusion, which, for the time required for vulcanization, is very limited, I make use of the capillary action of the fabric which acts as a wick to draw melted sulfur into intimate contact with the surrounding rubber, and to hold it as a reservoir, giving it up as it is needed, as vulcanization proceeds.

In practice, when the production of ground hard rubber is the object, I prefer to cut the fabric containing rubber into pieces of fairly uniform size, such, for instance, as will go through an inch or an inch and a half screen. I then impregnate the pieces for a short time in melted sulfur, or by mixing them in a mixing machine with melted sulfur, or by mixing them in a mixing machine with powdered sulfur which will be sucked into the fiber when they are subsequently heated, or in any other convenient way. I next subject them to the requisite vulcanizing temperature in any convenient way, and upon completion of the vulcanization, the time for which will depend upon the temperature employed, they are ready for grinding.

While I mention above pieces of considerable size I do not confine myself to pieces able size as the rubber can be reduced of large size as the rubber can be reduced by suitable means to pieces so small that some of the fiber can be separated before the remaining fiber is impregnated with sulfur for vulcanization.

I find that in order to save sulfur and also in order to control the resulting product so that a semi-hard product may be produced if desired, it is desirable to control with some care the amount of sulfur used for impregnating the fiber contained in the pieces. This can be controlled in various ways. If the pieces are immersed in melted sulfur for impregnating, the amount of the sulfur absorbed by the fiber, and the amount clinging to the outside of the pieces which will be drawn into the fiber as that already in it is used by the rubber as vulcanization proceeds, can be controlled by controlling the time of immersion, the temperature of the sulfur, and so its viscosity, and also by varying the ratio of the area of the surface to the weight of the pieces coated.

If it is desired to utilize the material in large pieces in its original form without grinding, pieces of suitable size are impregnated with the proper percentage of sulfur and vulcanized in any convenient way.

I claim:

1. The herein described process of producing hard rubber containing fabric from soft vulcanized rubber containing fabric, comprising impregnating with sulfur the contained fabric in the soft vulcanized rubber, and subjecting it to a vulcanizing temperature for a sufficient time to vulcanize the soft rubber hard.

2. The herein described process of producing hard, or semi-hard rubber containing fabric from soft vulcanized rubber containing fabric, comprising impregnating with sulfur the contained fabric in the soft vulcanized rubber, and subjecting it to a vulcanizing temperature for a sufficient time to vulcanize the soft rubber hard.

3. The herein described process of producing hard rubber containing fabric from soft vulcanized rubber containing fabric, comprising introducing the necessary sulfur into the soft vulcanized rubber through the fabric by utilizing its capillary action to conduct the melted sulfur into the rubber, the subsequent diffusion of the sulfur to all parts of the rubber, and the subjection to a vulcanizing temperature for a sufficient time to effect the change.

4. The herein described process of producing hard rubber dust from soft vulcanized rubber containing fabric, comprising reducing the soft rubber scrap to pieces, impregnating the contained fiber with sulfur, subjecting them to a vulcanizing temperature for a sufficient time to vulcanize the soft rubber hard, and grinding the resulting hard rubber and fiber.

5. The herein described process of producing hard rubber dust from soft vulcanized rubber containing fabric, comprising reducing the soft rubber scrap to pieces, impregnating the contained fabric with sulfur, subjecting them to a vulcanizing temperature for a sufficient time to vulcanize the soft rubber hard and also to weaken the fiber of the fabric, and grinding the resulting hard rubber and weakened fiber.

6. The herein described process of producing hard rubber dust from soft vulcanized rubber containing fabric, comprising reducing the soft rubber scrap to pieces, impregnating the contained fabric with sulfur, subjecting them to a vulcanizing temperature for a sufficient time to vulcanize the soft rubber hard, grinding the resulting hard rubber and fiber, and separating the fiber from the hard rubber.

7. The herein described process of producing hard rubber dust from soft vulcanized rubber containing fiber, by reducing the soft rubber scrap to small pieces, separating some of the fiber, impregnating the remaining fiber with sulfur, subjecting to a vulcanizing temperature for a sufficient time to vulcanize the soft rubber hard, and grinding the resulting hard rubber and fiber.

8. As a new article of manufacture hard rubber containing fabric produced from soft vulcanized rubber containing fabric, by impregnating with sulfur the contained fabric in the soft vulcanized rubber, and subjecting it to a vulcanizing temperature for a sufficient time to vulcanize the soft rubber hard.

9. As a new article of manufacture hard rubber dust containing fiber produced from soft vulcanized rubber containing fabric, produced by reducing the soft rubber scrap to pieces, impregnating the contained fabric with sulfur, subjecting them to a vulcanizing temperature for a sufficient time to vulcanize the soft rubber hard, and grinding the resulting hard rubber and fiber.

10. As a new article of manufacture hard rubber dust containing fiber produced from soft vulcanized rubber containing fabric by reducing the soft rubber scrap to pieces, impregnating the contained fabric with sulfur, subjecting them to a vulcanizing temperature for a sufficient time to vulcanize the soft rubber hard and also to weaken the fibers of the fabric, and grinding the resulting hard rubber and weakened fiber.

11. As a new article of manufacture hard rubber dust produced from soft vulcanized rubber containing fabric by reducing the soft rubber scrap to pieces, impregnating the contained fabric with sulfur, subjecting them to a vulcanizing temperature for a sufficient length of time to vulcanize the soft rubber hard, grinding the resulting hard rubber and fiber, and separating the fiber from the hard rubber.

12. As a new article of manufacture semi-hard rubber containing fabric produced from soft vulcanized rubber containing fabric, by impregnating with sulfur the contained fabric in the soft vulcanized rubber, and subjecting to a vulcanizing temperature for a sufficient time to vulcanize the soft rubber semi-hard.

STUART B. MOLONY. [L. S.]